Patented Jan. 10, 1939 2,143,306

UNITED STATES PATENT OFFICE 2,143,306

METHOD FOR THE PURIFICATION AND CLEANSING OF SEED AND CEREAL GRAINS

Theodore Earle, Pacific Palisades, Calif.

No Drawing. Application March 23, 1937, Serial No. 132,552

8 Claims. (Cl. 209—166)

This invention relates to the treatment of seed and cereal grains for the separation and removal therefrom of influences and agencies productive of a deleterious effect on either the germinating, growing, or food qualities of such grains, and has as an object to provide an improved method operable to the end set forth.

A further objective of the invention is to provide an improved method for the purification of seed and cereal grains which is efficiently operable to detach, separate and remove disease-promoting agents from the individual grain element.

A further object of the invention is to provide an improved method for the purification of seed and cereal grains which is efficiently operable to separate and eliminate from the body of the grain the insects, eggs, nits, and larvae of the grain feeding insects, as well as such grain elements as may be exteriorly or interiorly infested with such insects or their traces.

A further object of the invention is to provide an improved method for the treatment of seed and cereal grains which is efficiently and progressively operable to separate and remove undesirable and contaminating elements associated with such grain and to separate and remove disease-promoting or grain-infesting agencies to which the grain has become subject.

A further object of the invention is to provide an improved treatment for seed and cereal grains susceptible of simple, inexpensive, and rapid operation to cleanse and purify such grains through the detachment and removal from the grain body of undesirable and deleterious matter therewith associated and through the elimination of disease-promoting and grain-infesting agencies.

My invention consists in the nature and character of specific steps, and in the sequence and combination thereof, hereinafter set forth and pointed out in my claims.

Seed and cereal grains are commonly treated by various methods in an attempt to cleanse and purify the grain by the removal therefrom of weak, unfertile, and foreign seed matter and the removal or inactivation of disease-promoting and grain-infesting agencies, such as fungus growths and spores, grain parasites, and the eggs, nits and larvae left by grain-infesting insects. Such attempts at grain cleansing and purification are commonly made through means which fall into one or the other of two general classifications. In the first classification are grouped the blowers, screens, centrifugal devices, washers, and like strictly mechanical apparatus through which the grain is passed in an effort to classify its constituent elements according to their specific gravities or weights and sizes, for the separation of a clean and uniform product. This method is reasonably efficient in the removal of light weight grains and foreign seeds, but results in a considerable loss of the good grains sought to be recovered if a particularly clean separation is attempted; further, this method provides no means for the clean detachment, separation and removal from the grain of fungus and other disease-promoting spores which escape from the ruptured or shattered pods and become scattered through and become attached to the surface of the desired grain elements. At best, this method is productive of a but partially cleaned and purified grain remaining after a disproportionate loss of good grain and expenditure of expense and operating energy.

The second conventional method for the cleansing and purification of grain involves treating the grain with a medicated solution designed to kill or inactivate the disease-promoting or grain-infesting agencies. This latter method makes no provision for separating and eliminating the undesirable elements and agencies from the grain, and is further objectionable in that thorough inactivation of the agencies sought to be suppressed may require a long period of time and involve an expensive installation of equipment when any commercial quantities of grain are to be handled.

While it is possible to combine the methods just described for a reasonably efficient treatment of the grain, any such combination results in a method that is slow, expensive in operation, and wasteful of the sound and valuable grain elements.

Experiment has definitely established that a thoroughly cleansed and purified grain, free from foreign matter, diseased or infested grains, and disease-promoting or grain-infesting material, may be readily and inexpensively obtained through the use of properly controlled and regulated froth flotation methods, either alone or in combination with certain of the conventional steps now employed to that end. The specific steps, and combinations of steps, to be employed in the cleansing and purification of given grain material will necessarily vary with the specific nature of such material and the degree of its adulteration and infestation, but where a thoroughly cleansed and purified product is desired, economy and efficiency can best be served by including a properly regulated step of froth flotation in the process to which the material is subjected.

In the practice of the improved method, the material to be treated may be passed directly to a froth flotation cell for agitation therein in the presence of suitable reagents, as hereinafter more fully described, but in some instances it will probably be found expedient and desirable to treat the material by more conventional means for a preliminary removal of foreign matter and undesirable constituents either before or after the flotation treatment. Whatever be the specific arrangement of steps constituting the cleansing and purifying process, the material is at some time agitated in a froth flotation cell for the high degree of final purification desired. The grain material may be passed through screens for grading as to size and for simultaneous removal of any oversized foreign matter, or may be initially or subsequently treated through conventional gravity apparatus wherein the material is classified according to relative specific gravity, most of the lighter material, such as foreign matter, infested grains, smut balls, and the like being therein separated and removed from the solid grain material, as is common practice. In addition to the steps just recited, or alternative thereto, the material may be submerged in a water bath wherein much of the undesirable light weight material will rise to the surface for ready removal and subsequent elimination from the further phases of the treatment. It is to be understood that the above noted preliminary phases of the treatment may be dispensed with entirely, may be employed individually, or may be combined as may appear more expedient or desirable in a given instance, and that such phases are to be employed solely to expedite the froth flotative treatment which constitutes the essence of the instant invention.

A first and essential novel step of the improved method where the seeds are infested with exterior fungus or other growths involves agitation of the grain material for the purpose of and to that degree necessary to accomplish a thorough rubbing and individual washing of the material grains for loosening and detachment of contaminating material from the grain surfaces. This agitation may be accomplished as an incident of the treatment of the material in froth flotation apparatus, either in the presence of flotation reagents or prior to the addition of the latter, or such agitation may be effected through apparatus separate from the flotation devices prior to the introduction of the material into the latter. The agitation is preferably accomplished in a water medium through means which will not crush or crack the individual grains, and should be of such intensity and duration as may be required to thoroughly free the grain surfaces from any adherent contaminating material or agents.

Following the agitation just above described, the material is further agitated in froth flotation apparatus in the presence of suitable flotation reagents, such as frothers or collectors, or both, for the final and complete separation and removal as a froth concentrate of the undesirable material and agencies detached from the grain. The apparatus employed for the froth flotation operation may be of any type suitable to the purpose, and must be arranged to avoid crushing, cracking, or like damage to the individual grains during its operation. The operative speed of the flotation apparatus and the rate of feed to such apparatus will necessarily vary for best results with different specific grains and are best determined by actual test of the grain to be treated. The factors determining best results in conventional froth flotation, such as time-conditioning of the feed material in the presence of the flotative reagents, or simply agitating in the water, control of the hydrogen ion concentration of the flotation solution, and the like, must be given consideration in the practice of the improved method and should be regulated and controlled in accordance with the well known principles of conventional froth flotation.

The feed of material to the flotation apparatus may be accomplished either through the froth bed of the flotation unit or to the liquid charge of such unit below the froth line, either method of feeding for the specific seed being productive of the desired results when a proper flotation technique is followed. The flotation reagents employed with satisfactory results on various grains include the conventional frothers such as terpineol, pine oil, cresylic acid, the higher alcohols, such as the Du Pont frothers, and the like, as well as the usual collectors such as the fatty acids and their derivatives and various mineral and vegetable oils. The amount of any one reagent required to effect a clean separation of the grain material will vary between a fraction of one percent and forty pounds per ton of grain.

The separated froth concentrates and tails from an initial flotation operation may be subsequently routed through further froth flotation operations accomplished with the same or different reagents, or the products from the initial flotation treatment may be dried, screened or otherwise classified, and thus made available for use, the cleansed and purified grain material being a high quality product available for seeding or milling purposes, and the froth concentrates frequently being of value as a source of certain desirable by-products, of which ergot derived from certain fungus spores of rye, is an example. For the purpose of suppressing or neutralizing disease-promoting and grain-infesting agencies during the separatory process, the froth flotation may be accomplished in a medicated solution, or the products from such flotation may be later treated with such a medicated solution.

While it is possible to effect the desired cleansing and purification of the grain material through a single step of froth flotation, it is often of practical advantage to first remove as much of the foreign and deleterious matter as may be possible through the preliminary treatments first recited, since the agitation of the material in the flotation apparatus acts to break apart and disrupt smut balls and similar fungus contamination with a resultant spread and dissemination of the disease-promoting spores throughout the material.

It has been noted that any insect-infestation of the grain material, either external or internal, so alters the flotative characteristics of the infested grains as to permit of a positive separation of such infested grains from the sound grain material during froth flotation thereof, the infested grains reacting to the flotation treatment so as to become a part of the froth concentrate with consequent elimination from the sound material of all infested insects, eggs, nits, and larvae.

While air bubbles generated in flotation apparatus in the absence of flotation reagents have a notable power to attach themselves to and elevate smut balls and like undesirable material, experiment has established that such treatment alone will not remove all of the disease-promoting contamination from the grain and that a disease and insect free grain product may be derived through flotation treatment only when suitable flotation reagents are employed to collect and elevate the contaminating matter.

Certain grain materials are characterized by the presence of natural oils or other surface attributes which react to facilitate the froth flotation step in a manner identical with the results deriving when flotation reagents are added, in which event a frothing, or other reagent may be naturally present and the addition thereof to the froth flotation step consequently dispensed with. The solutions filtered or drained away from the froth concentrates and tails after completion of the separatory operations may be advantageously salvaged and returned for reuse in the improved method, since such solutions are charged with the flotation reagents and their reuse represents a material economy in respect to such reagents.

As examples of the efficiency and desirability of the improved method, the following data as to technique employed and results obtained in certain actual tests, is submitted.

*Example Number 1.*—500 grams of Red Winter wheat carrying two per cent stinking smut, some chaff, weed seed and poor wheat grains, was treated in a 1000 gram Denver Equipment Laboratory flotation cell wherein the impeller has been modified by removal of its bottom vanes and lowering of its position in the cell so as to avoid damage to the grains. The cell was given a normal charge of water having a pH of 7.1, compressed air was fed to the cell and the impeller actuated only rapidly enough to break up the incoming air stream into small bubbles. While the cell was so operated, the grain material was poured in and a surface concentrate of light weight material was separated from the grain and removed. This first concentrate weighed 12.5 grams, being 2.5 per cent of the material, and contained most of the smut balls and chaff and a few (17) wheat grains.

After removal of the first concentrate, the impeller of the cell was speeded up and the grain thereby violently agitated in the cell for five minutes, whereafter three drops of Du Pont frother B-23 (0.3 pound per ton) were added to the cell, agitation of the cell contents continues for three minutes, and the froth concentrate resulting was removed. The second or froth concentrate weighed 14 grams and contained 14 wild oat seeds, a few small weed seeds, 2 smut balls and poor quality wheat. This concentrate was screened over an eighty-mesh screen and the solution passing through the screen was filtered for recovery of the loose smut spores carried thereby, which, when recovered and dried weighed 0.72 gram. The cleaned wheat representing the tailings from the cell was carefully examined and found to be free from all impurities.

This example demonstrates clearly that the first or gravity treatment of the material was not adequate to remove all of the infesting agencies and would, therefore, have been of no value in preventing smut infestation of the grain after planting, without the further froth flotation treatment of the material with a suitable reagent.

*Example Number 2.*—A 200 gram sample of Winter wheat infested with stinking smut was treated in the same flotation cell used in Example Number 1 and under initial conditions identical with those obtaining in the above example. After charging of the cell with water and prior to any agitation of the cell charge, the grain sample was introduced into the cell and was therein mildly agitated for fifteen seconds through slow rotation of the impeller and without the use of any frothers. During this slight agitation, some light weight material rose to the surface of the liquid and was removed and was found to have a weight of 2.8 grams and to contain 15 smut balls, 3 weed seeds, some chaff, and a few wheat grains with their hulls adhering. Next, the cell contents were agitated by the introduction of air with the impeller inactive, and a further accumulation of light weight material was had on the surface of the liquid, this second concentrate weighing 1.8 grams and containing 6 smut balls, 6 weed seeds, some chaff, and a few wheat grains with husks. Following removal of the second concentrate, the impeller was operated for relatively violent agitation of the cell contents and the resulting surface concentrate of light weight material removed and determined to have a weight of 0.14 gram and to contain 5 smut balls, 2 weed seeds, and some chaff.

After removal of the three concentrates above specified, the contents of the cell were violently agitated by means of the impeller for a period of three minutes, whereafter two drops of pine oil were added to the cell and agitation continued for the formation of a froth concentrate. The froth concentrate thus developed weighed 19 grams and contained 4 smut balls, 12 wild oat seeds, some small weed seeds, and wheat grains of poor quality. The water from the froth concentrate when filtered gave a weight of the smut spores carried thereby as 0.3 gram.

This example conclusively shows that while some of the contaminating matter, especially the smut balls and spores, can be eliminated from the grain by gravity methods alone and in combination with either mechanical or air agitation, certain portions of the contaminating matter are not susceptible of separation by such methods and can be removed from the sound grain only by froth flotation accomplished through the use of suitable reagents. The froth flotation removes the disease spores and certain weed seeds and poor quality grains which can not be segregated from the sound grain through conventional gravity separation and agitation methods.

In the commercial practice of the improved method it is contemplated that the preliminary removal of much of the undesirable matter accomplished through air and impeller agitation of the grain material in a water bath will be combined in one operation accomplished through apparatus similar to the typical flotation cell wherein is found an agitation zone and a relatively quiet or undisturbed zone, thus permitting the sound grain material to drop out of the agitation zone into the quiet zone while the undesirable material is carried to the surface of the bath for removal from the apparatus, the sound material then passing to froth flotation apparatus for its ultimate cleansing and purification.

Since many changes in the specific character, nature, sequence, and combination of the steps comprising the improved method may readily be had, and may in fact be necessary in adapting the invention for the practical treatment of specific grains, I wish to be understood as being limited solely by the scope of the appended claims rather than by any details of the foregoing description.

I claim as my invention—

1. The method of treating seeds and cereal grains for the separation and removal therefrom of fungus growths, spores, spore cells, insects and their eggs, larvae, nits, and infested grains, which consists of agitating the material in a froth flotation cell in the presence of a reagent consisting of a relatively minute amount of a true frother, for physical detachment of infesting material from the seed and grain surfaces through rubbing contact between said surfaces, thorough exposure of the infesting material surfaces to contact with the frother, and development of a froth bed in the cell, and consequent selective elevation of the detached infesting agencies and infested grains as a froth-held concentrate separate from the cleansed material remaining as a tailings product in the cell.

2. The method of treating seeds and cereal grains for the separation and removal therefrom of fungus growths, spores, spore cells, insects and their eggs, larvae, nits, and infested grains, which consists of agitating the material in a froth flotation cell in the presence of reagents consisting of relatively minute amounts of a true frother and a collector, for physical detachment of infesting material from the seed and grain surfaces through rubbing contact between said surfaces, thorough exposure of the infesting material surfaces to contact with the frother and collector, and development of a froth bed in the cell, and consequent selective elevation of the detached infesting agencies and infested grains as a froth-held concentrate separate from the cleansed material remaining as a tailings product in the cell.

3. The method of treating seeds and cereal grains for the separation and removal therefrom of fungus growths, spores, spore cells, insects and their eggs, larvae, nits, and infested grains, which consists of agitating the material in a water bath to physically detach the infesting agencies from the grain surfaces through rubbing contact between said surfaces, addition to said mixture of a reagent consisting of a relatively minute amount of a true frother, subsequent agitation of the mixture and reagent for development of a froth bed and for thorough exposure of the grain and infesting material surfaces to intimate contact with the reagent, and consequent selective elevation of the detached infesting agencies and infested grains as a froth-held concentrate separate from the cleansed material remaining as a tailings product in the cell.

4. The method of treating seeds and cereal grains for the separation and removal therefrom of fungus growths, spores, spore cells, insects and their eggs, larvae, nits, and infested grains, which consists of agitating the material in a water bath to physically detach the infesting agencies from the grain surfaces through rubbing contact between said surfaces, addition to said mixture of a reagent consisting of relatively minute amounts of a true frother and a collector, subsequent agitation of the mixture and reagents for development of a froth bed and for thorough exposure of the grain and infesting material surfaces to intimate contact with the reagents, and consequent selective elevation of the detached infesting agencies and infested grains as a froth-held concentrate separate from the cleansed material remaining as a tailings product in the cell.

5. The method of treating seeds and cereal grains for the separation and removal therefrom of fungus growths, spores, spore cells, insects and their eggs, larvae, nits, and infested grains, which consists of agitating the material in a water bath to physically detach infesting material from the grain surfaces through rubbing together of said surfaces and for gravity separation of that portion of the infesting and infested material which will normally float away from the remaining material, removal of said gravity-separated material, addition to the remaining mixture of a reagent consisting of a relatively minute amount of a true frother, agitation of the mixture and reagent for the development of a froth bed and for thorough exposure of the infesting material and grain surfaces to intimate contact with the reagent, and consequent selective elevation of the detached infesting agencies and infested grains as a froth-held concentrate separate from the cleansed material remaining as a tailings product in the cell.

6. The method of treating seeds and cereal grains for the separation and removal therefrom of fungus growths, spores, spore cells, insects and their eggs, larvae, nits, and infested grains, which consists of agitating the material in a water bath to physically detach infesting material from the grain surfaces through rubbing together of said surfaces and for gravity separation of that portion of the infesting and infested material which will normally float away from the remaining material, removal of said gravity-separated material, addition to the remaining mixture of a reagent consisting of relatively minute amounts of a true frother and a collector, agitation of the mixture and reagents for the development of a froth bed and for thorough exposure of the infesting material and grain surfaces to intimate contact with the reagents, and consequent selective elevation of the detached infesting agencies and infested grains as a froth-held concentrate separate from the cleansed material remaining as a tailings product in the cell.

7. The method of treating seeds and cereal grains for the separation and removal therefrom of fungus growths, spores, spore cells, insects and their eggs, larvae, nits, and infested grains, which consists of classification of the material according to size and specific gravity for the separation and removal therefrom of a portion of the infesting and infested material from the grain, subsequent agitation of the remaining material in a froth flotation cell in the presence of a reagent consisting of a relatively minute amount of a true frother, for physical detachment of infesting material from the seed and grain surfaces through rubbing contact between said surfaces, thorough exposure of the infesting material surfaces to contact with the frother, and development of a froth bed in the cell, and consequent selective elevation of the detached infesting agencies and infested grains as a froth-held concentrate separate from the cleansed material remaining as a tailings product in the cell.

8. The method of treating seeds and cereal grains for the separation and removal therefrom of fungus growths, spores, spore cells, insects and their eggs, larvae, nits, and infested grains, which consists of classification of the material according to size and specific gravity for the separation and removal therefrom of a portion of the infesting and infested material from the grain, subsequent agitation of the remaining material in a froth flotation cell in the presence of a reagent consisting of relatively minute amounts of a true frother and a collector, for physical detachment of infesting material from the seed and grain surfaces through rubbing contact between said surfaces, thorough exposure of the infesting material surfaces to contact with the frother and collector, and development of a froth bed in the cell, and consequent selective elevation of the detached infesting agencies and infested grains as a froth-held concentrate separate from the cleansed material remaining as a tailings product in the cell.

THEODORE EARLE.